US009566596B2

(12) United States Patent
Kim et al.

(10) Patent No.: US 9,566,596 B2
(45) Date of Patent: Feb. 14, 2017

(54) SPRAY PUMP

(71) Applicant: YONWOO CO., LTD., Incheon (KR)

(72) Inventors: Seong-Ho Kim, Incheon (KR); Chin Wook Chung, Incheon (KR); Cheol Ho Jang, Incheon (KR); Hyung Sub Lee, Incheon (KR); Woo Il Jo, Incheon (KR); Joong Cho Kook, Incheon (KR)

(73) Assignee: YONWOO CO., LTD., Incheon (KR)

( * ) Notice: Subject to any disclaimer, the term of this patent is extended or adjusted under 35 U.S.C. 154(b) by 0 days.

(21) Appl. No.: 14/342,645

(22) PCT Filed: Sep. 20, 2012

(86) PCT No.: PCT/KR2012/007529

§ 371 (c)(1),
(2) Date: Mar. 4, 2014

(87) PCT Pub. No.: WO2013/042951

PCT Pub. Date: Mar. 28, 2013

(65) Prior Publication Data

US 2014/0217124 A1 Aug. 7, 2014

(30) Foreign Application Priority Data

Sep. 20, 2011 (KR) ........................ 10-2011-0094778

(51) Int. Cl.

| | |
|---|---|
| ***B65D 88/54*** | (2006.01) |
| ***G01F 11/00*** | (2006.01) |
| ***B05B 11/00*** | (2006.01) |
| ***B05B 1/34*** | (2006.01) |

(52) U.S. Cl.
CPC ......... *B05B 11/3001* (2013.01); *B05B 1/3415* (2013.01); *B05B 11/0016* (2013.01); *B05B 11/3025* (2013.01); *B05B 11/3069* (2013.01); *B05B 11/3074* (2013.01); *B05B 11/3049* (2013.01)

(58) Field of Classification Search
CPC .. B05B 11/3001; B05B 11/0048; A45D 34/00
USPC ............................................ 222/321.9, 321.8
See application file for complete search history.

(56) References Cited

U.S. PATENT DOCUMENTS 3,921,861 A * 11/1975 Kondo .......................... 222/257
4,325,501 A * 4/1982 Shay .......................... 222/321.2
4,340,158 A * 7/1982 Ford ..................... B05B 11/306 222/153.13

(Continued)

FOREIGN PATENT DOCUMENTS

JP 2002-066401 3/2002
KR 1020040053466 6/2004

(Continued)

*Primary Examiner* — Patrick M Buechner
*Assistant Examiner* — Jeremy W Carroll
(74) *Attorney, Agent, or Firm* — Marshall, Gerstein & Borun LLP

(57) ABSTRACT

A spray pump is provided where two seal caps are arranged in an upper portion and a lower portion within a cylinder housing so as to prevent the contents from leaking, the cylinder housing a wall surface with one or more leakage discharge holes so that the content which can be accumulated within the cylinder housing is discharged through the leakage discharge holes rather than a content flow path, thereby enabling an efficient operation.

4 Claims, 4 Drawing Sheets

(56) References Cited

U.S. PATENT DOCUMENTS

| | | | | |
|---|---|---|---|---|
| 5,025,956 | A * | 6/1991 | Linsenbigler | 222/153.13 |
| 5,671,874 | A * | 9/1997 | Behar et al. | 222/341 |
| 5,992,704 | A * | 11/1999 | Jager-Waldau | 222/341 |
| 6,375,045 | B1 * | 4/2002 | Ki | 222/386 |
| 2007/0158369 | A1 * | 7/2007 | Margheritis et al. | 222/321.9 |
| 2009/0071985 | A1 * | 3/2009 | Ki | 222/309 |
| 2010/0051649 | A1 * | 3/2010 | Ki | 222/256 |
| 2010/0135834 | A1 * | 6/2010 | Tseng | 417/521 |
| 2010/0170917 | A1 * | 7/2010 | Ki | 222/256 |
| 2012/0267399 | A1 * | 10/2012 | Moretti | 222/321.2 |
| 2012/0325862 | A1 * | 12/2012 | Kuwahara et al. | 222/321.9 |
| 2013/0026186 | A1 * | 1/2013 | Jenkins | 222/153.13 |

FOREIGN PATENT DOCUMENTS

| | | |
|---|---|---|
| KR | 2004369570000 | 10/2007 |
| KR | 1008197640000 | 4/2008 |
| KR | 2020110006853 | 7/2011 |

* cited by examiner

Prior Art

SPRAY PUMP

BACKGROUND

The present invention relates to a spray pump, and in particular to a spray pump which sprays liquid contents and comprises an under cap 110; an over cap 120 engaged to the under cap 110; a cylinder housing 130 which is engaged to the bottom of the over cap 120 and has a suction through hole at its lower side and a check valve 132 installed at an inner, lower side of the top of the suction through hole; a stem 140 which passes through the over cap 120; a main spring 145 which is installed between the over cap 120 and an outer circumferential surface of the stem 140; a piston rod 150 which is engaged to the stem 140 and has at least two side passage holes 152 at a lower, side surface; a first seal cap 160 which is installed movable in upward and downward directions at the bottom of the piston rod 150; a second seal cap 170 which is engaged to the piston rod 150 at the top of the first seal cap 160; an inner spring 175 which is installed between the second seal cap 170 and the first seal cap 160; a first leakage discharge hole 135 which is formed at a side surface wall of the cylinder housing 130 and is positioned at the top of 'the Highest Position of the first seal cap 160' (shown as "H" in FIG. 2) and the bottom of 'the Bottommost Position of the second seal cap 170' (shown as "B" in FIG. 3); a second leakage discharge hole 136 which is formed at a side surface wall of the cylinder housing 130 and is positioned at the bottom of 'the Highest Position of the second seal cap 170' (shown as "H" in FIG. 2); a spray button 190 which is engaged to the top of the stem 140 and has a spray passage 191 communicating in a lateral direction; and a spray nozzle member 192 which is engaged to a discharge port of the spray passage.

A spray pump is sort of a pump which can spray liquid contents in mist forms when a user presses a button. The spray pump has been widely used so as to spray liquid cosmetic or liquid medicine which is generally stored in a container.

In terms of the spray pump, there are many examples such as the Korean Registration Patent No. 10-0485039 directed to "Spray pump for cosmetic container" (hereinafter referred to as "Patent Document 1") or the Korean Published Patent No. 10-2000-0052881 directed to "The spray pump delivery system of the capacity which concentrated is reduced." (hereinafter referred to as "Patent Document 2").

As shown in FIG. 1, the spray pump for a cosmetic container of the patent document 1 has features in that in a housing 20 is provided a cylindrical guide tube 24 which protrudes upward for thereby partitioning a compression chamber 21 and an operation chamber 22, and from a lower, outer surface of a second valve 50 integrally protrudes a sealing ring 51 in an upward direction and with a certain elastic force, the sealing ring having a downwardly tapered surface. As the pressure in the compression chamber 21 increases, the sealing ring 51 widens in an outward direction for thereby enhancing air tightness with respect to a guide tube 24. In case of the prior art of the patent document 1, since a spring is provided in the housing 20, a metallic spring which serves to operate a pumping member comes into direct contact with the contents, which causes a corrosion of the metallic spring thanks to the contents.

Since only one leakage discharge hole is formed at the top of the piston ring 31, the leaked liquid gathered in a space except for a passage through which liquid can pass only when the piston ring 31 rises can be discharged, so it is impossible to obtain an efficient discharge of leaked liquid, and such operations seem inefficient. The above described problems also lie in the prior art of the patent document 2.

SUMMARY OF THE INVENTION

Accordingly, the present invention is made so as to improve the above mentioned problems. It is an object of the present invention to provide a spray pump which has features in that a seal cap positioned in the interior of a cylinder housing is provided at an upper side and a lower side, respectively, so as to prevent the leakage of liquid. At least one leakage discharge hole is formed at a wall surface of a cylinder housing, so the contents which may gather in the cylinder housing can discharge through at least one leakage discharge hole, not through a flow passage of the contents, for thereby obtaining an efficient operation.

It is another object of the present invention to provide a spray pump which has features in that a spring engaging shoulder is formed at the top of a stem so that a metallic spring which causes a piston rod to operate does not come into direct contact with contents. It is possible to install, outside the cylinder housing, a spring which used to be installed at the bottom of a piston rod by which the contents move in the interior of the cylinder housing. The corrosion of the spring which used to happen as it comes into direct contact with the contents can be prevented. Any spoilage of the contents due to the corrosion of the spring can be prevented.

It is further another object of the present invention to provide a spray pump which makes it possible to easily adjust a spray angle in a visible way with the aid of a construction that the colors change based on the spray angle of a spray nozzle member.

To achieve the above objects, there is provided a spray pump which sprays liquid contents, comprising an under cap 110 which has a through hole 111 at its center; an over cap 120 which is engaged to the through hole 111 of the under cap 110 and has a stem installation hole 121 at its inner side; a cylinder housing 130 which is engaged to the bottom of the over cap 120 and has a suction through hole at its lower side and a check valve 132 installed at an inner, lower side of the top of the suction through hole for thereby allowing fluids to flow only in a suction direction; a stem 140 which passes through the stem installation hole 121 of the over cap 120, the center of the stem being passed through from its top to bottom; a main spring 145 which is installed between the over cap 120 and an outer circumferential surface of the stem 140; a piston rod 150 which is inserted into the bottom of the stem 140 and has, on its central axis, a fluid passage hole 151 whose top is open and whose bottom is closed, at least two side passage holes 152 being formed at the lower side surface of the fluid passage hole 151; a first seal cap 160 which is installed movable in upward and downward directions at the bottom of the piston rod 150 and closes the side passage hole 152 at a descending point and opens the side passage hole 152 at an ascending point, an outer circumferential surface of the first seal cap 160 coming into close contact with an inner surface of the cylinder housing 130; a second seal cap 170 which is engaged to the piston rod 150 at the top of the first seal cap 160, an outer circumferential surface of the second seal cap 170 coming into close contact with an inner surface of the cylinder housing 130; an inner spring 175 which is installed between the second seal cap 170 and the first seal cap 160; a first leakage discharge hole 135 which is formed at a side surface wall of the cylinder housing 130 and is positioned at the top of 'the Highest Position of the first seal cap 160' (shown as "H" in FIG. 2)

and the bottom of 'the Bottommost position of the second seal cap 170' (shown as "B" in FIG. 3); a second leakage discharge hole 136 which is formed at a side surface wall of the cylinder housing 130 and is positioned at the bottom of 'the Highest Position of the second seal cap 170' (shown as "H" in FIG. 2); a spray button 190 which is engaged to the top of the stem 140 and has a spray passage 191 communicating in a lateral direction; and a spray nozzle member 192 which is engaged to a discharge port of the spray passage.

In addition, the stem 140 has a spring engaging shoulder 141 formed along an outer circumferential surface of the top, and main spring 145 is installed between the upper surface of the over cap 120 and the spring engaging shoulder 141, and an outer cover 195 has an opening 196 formed at its top through which opening passes the spray button 190 and is engaged to the under cap 110.

Meanwhile, the spray nozzle member 192 is made from a transparent material or a semitransparent material, and a spray nozzle connection member 193 whose colors change based on the spray angles of the spray nozzle member 192 is inserted between the spray passage 191 and the spray nozzle member 192.

According to the present invention,

In addition, a spring engaging shoulder is formed at the top of a stem so that a metallic spring which causes a piston rod to operate does not come into direct contact with contents. It is possible to install, outside the cylinder housing, a spring which used to be installed at the bottom of a piston rod by which the contents move in the interior of the cylinder housing. The corrosion of the spring which used to happen as it comes into direct contact with the contents can be prevented. Any spoilage of the contents due to the corrosion of the spring can be prevented.

Meanwhile, the spray pump makes it possible to easily adjust a spray angle in a visible way with the aid of the provision of a spray nozzle connection member 193 whose colors can change based on the spray angle of a spray nozzle member 192.

DETAILED DESCRIPTION OF THE INVENTION

Figure 1:
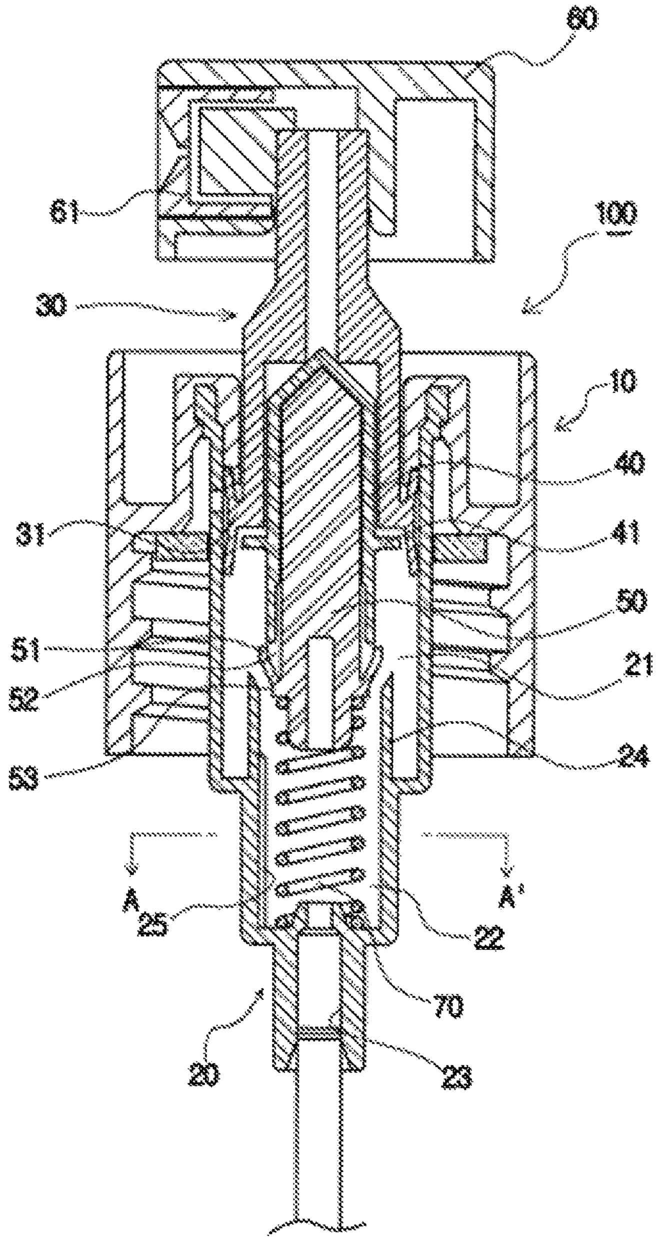
FIG. 1 is a cross sectional view illustrating a conventional spray pump.

The spray pump according to an embodiment of the present invention will be described with reference to the accompanying drawings. The same elements or parts shown in the drawings are given the same reference numerals. The detailed descriptions on the known function or construction will be omitted in the middle of the descriptions.

Figure 2:
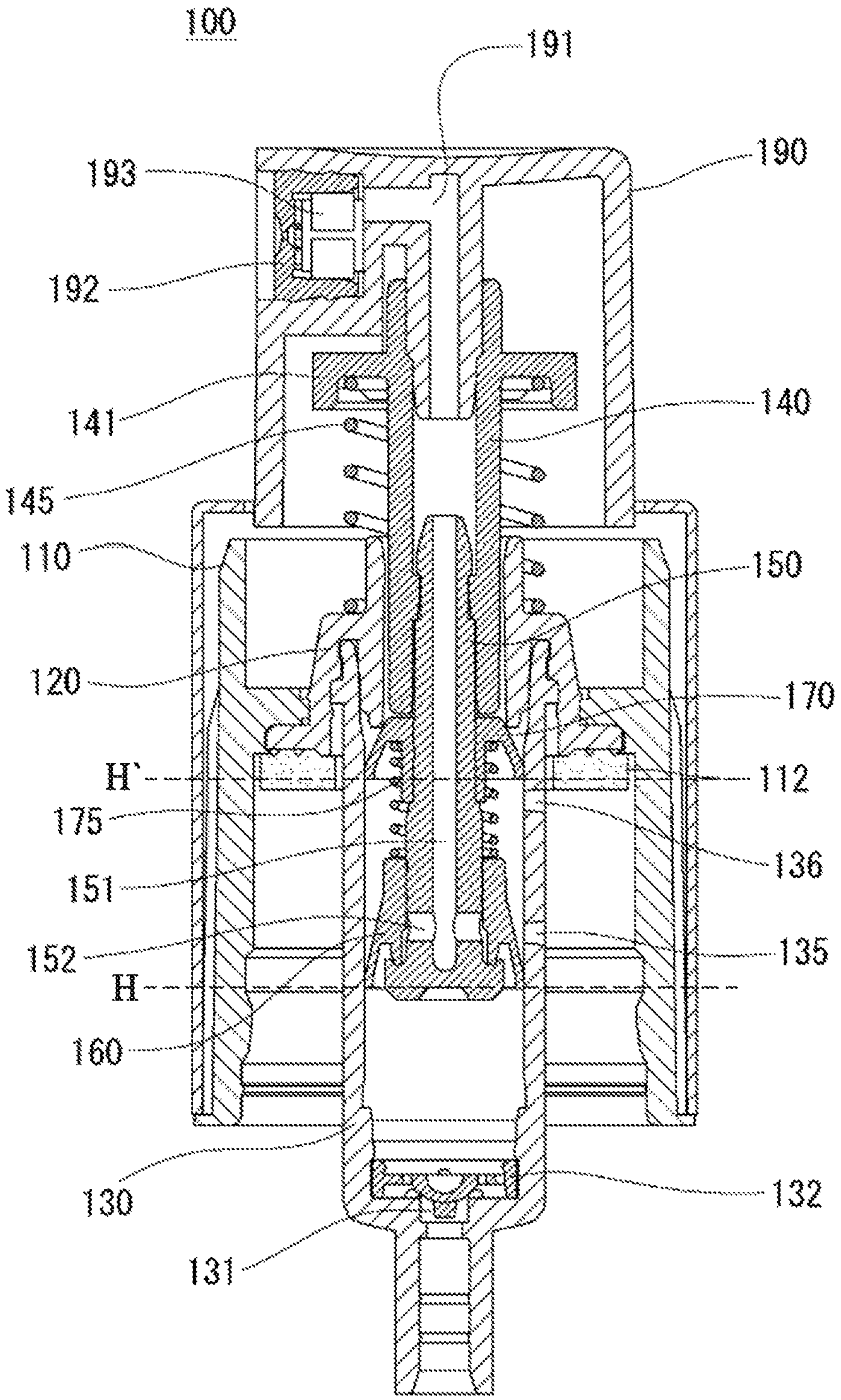
FIG. 2 is a cross sectional view illustrating a spray pump according to an embodiment of the present invention.

As shown in FIG. 2, the spray pump according to the present invention comprises an under cap 110, an over cap 120, a cylinder housing 130, a stem 140, a main spring 145, a piston rod 150, a first seal cap 160, a second seal cap 170, an inner spring 175, a first leakage discharge hole 135, a second leakage discharge hole 136 and a spray button 190.

First of all, the under cap 110 will be described. As shown in FIG. 2, in the center of the under cap 110 is formed a through hole 111. The under cap 110 is engaged to the top of a container which stores liquid contents. In this case, as shown in FIG. 2, it is preferred that a gasket 112 is further installed so as to increase a sealing performance between the under cap 110 and the container.

Figure 4:
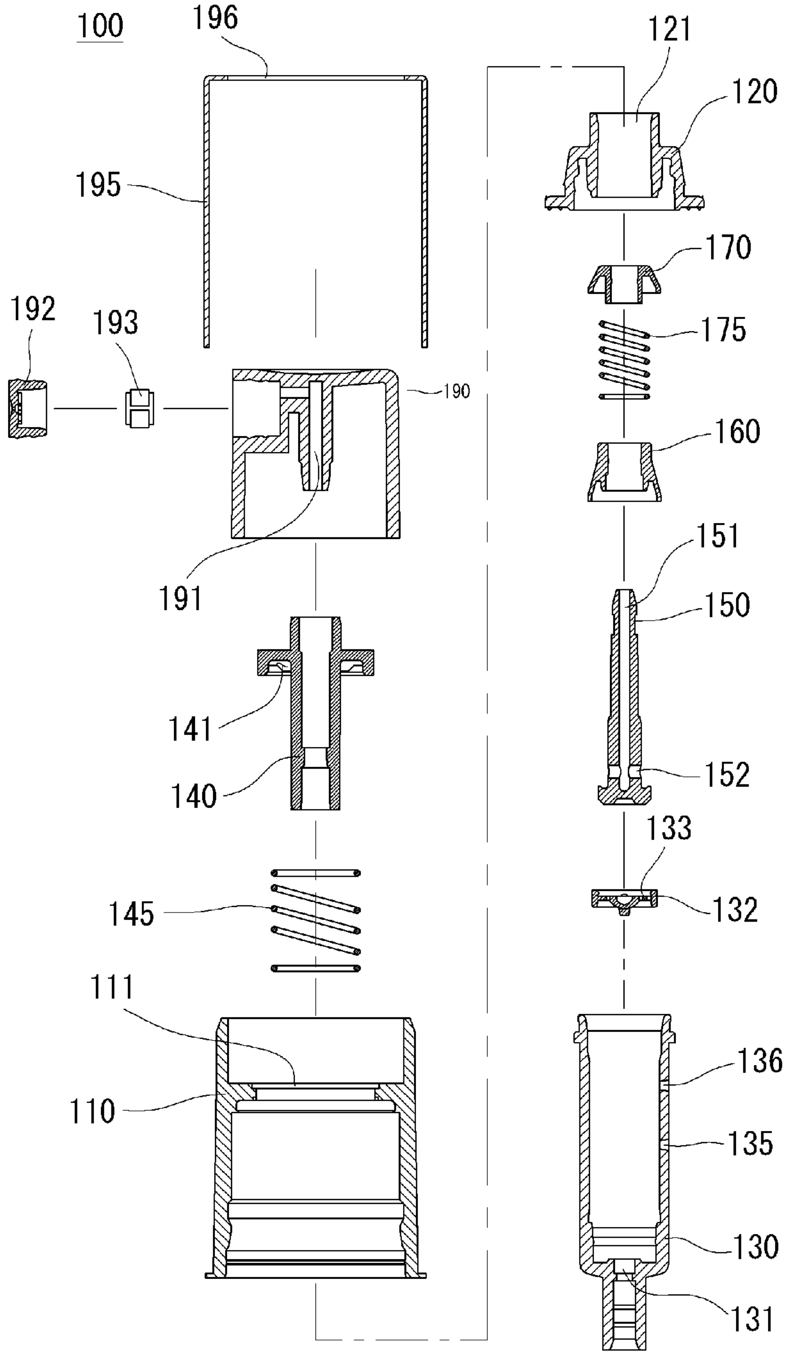
FIG. 4 is a cross sectional view illustrating a state that a spry pump is disassembled and assembled according to an embodiment of the present invention.

Next, the over cap 120 will be described. As shown in FIGS. 2 and 4, the over cap 120 is engaged to a through hole 111 of the under cap 110. At an inner side of the over cap is formed a stem installation hole 121. As shown in FIGS. 2 and 4, a suction through hole is formed at a lower side of the over cap 120. To the bottom of the over cap 120 is engaged the cylinder housing 130 which is installed as a check valve 132 allowing fluid to flow only in a suction direction is mounted at the bottom of the upper, inner side of the suction through hole which is formed at the lower side.

Figure 3:
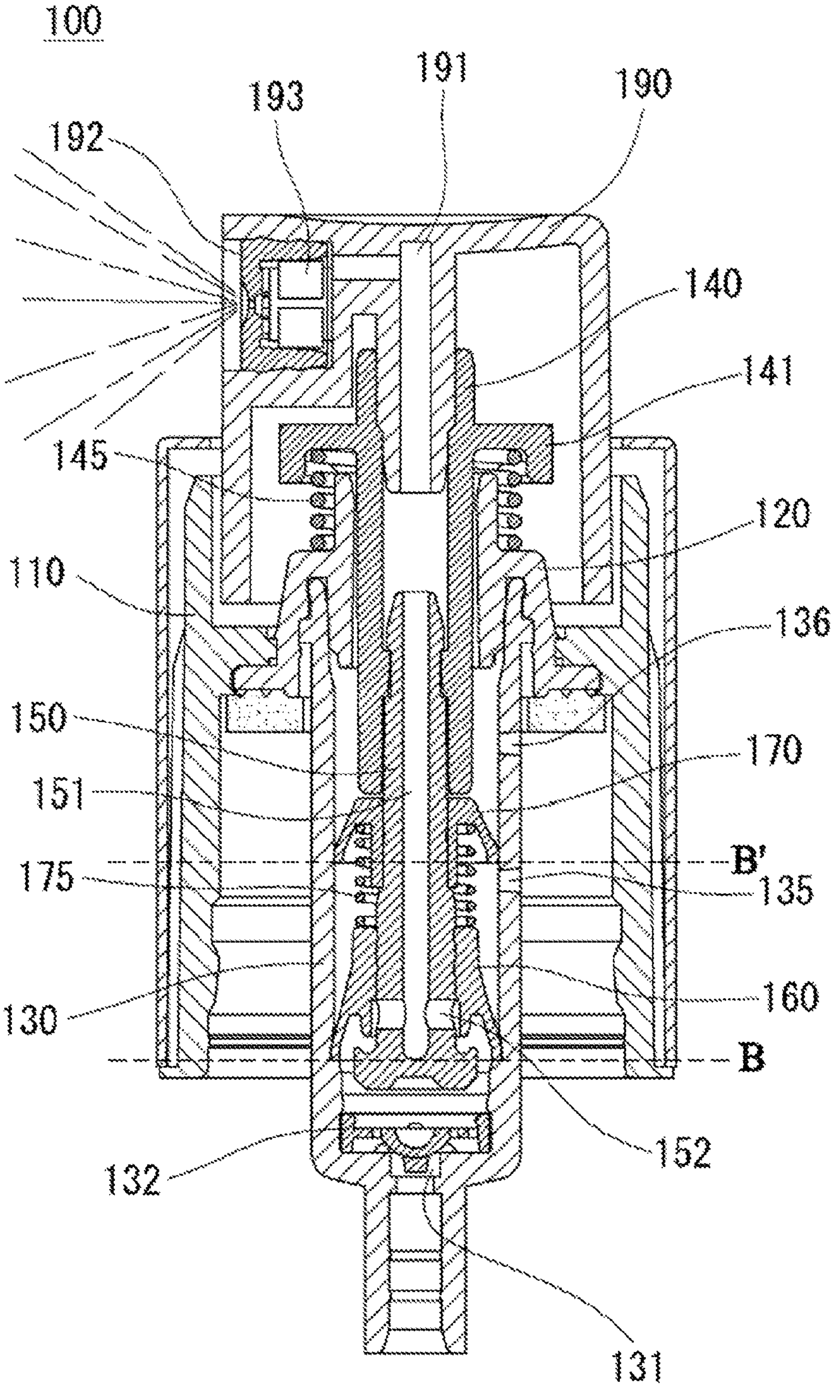
FIG. 3 is a cross sectional view illustrating a state that a spray pump sprays according to an embodiment of the present invention.

As shown in FIGS. 2 and 4, the stem 140 passes through a stem installation hole 121 of the over cap 120. The top and bottom of the stem pass through. A spring engaging shoulder 141 is formed along an upper, outer circumferential surface of the stem. As shown in FIGS. 2 and 3, a main spring 145 is installed between the over cap 120 and an outer circumferential surface of the stem 140, so the stem 140 is operable with elastic force with respect to the over cap 120. As a result, any contacts between the liquid contents and the main spring 145 are not allowed, so it is possible to prevent corrosions or damages of the main spring 145 the problems of which used to happen as it comes into direct contact with the liquid contents. In this case, the main spring 145 can be installed between the over cap 120 and the stem 140 in various forms. As one example, as shown in FIGS. 2 and 3, it is preferred that a spring engaging shoulder 141 is further formed along an upper, outer circumferential surface in the stem 140, and the main spring 145 is installed between the upper surface of the cylinder over cap 120 and the spring engaging shoulder 141.

As shown in FIGS. 2 and 4, at the bottom of the stem 140 is formed a fluid passage hole 151 whose too is open and whose bottom is closed in the central axis. The piston rod 150 with at least two side passages is inserted into the side surface of the bottom of the fluid passage hole 151. As shown in FIGS. 2 and 4, at the bottom of the piston rod 150 is installed a first seal cap 160 which closes the side passage hole 152 at the descending point and opens the side passage hole 152 at the ascending point and which is movable upward and downward. The outer circumferential surface of the first seal cap 160 comes into close contact with the inner surface of the cylinder housing 130.

Meanwhile, as shown in FIGS. 2 to 4, at the top of the first seal cap 160 is installed a second seal cap 170 which is engaged to the piston rod 150 and whose outer circumferential surface comes into close contact with the inner surface of the cylinder housing 130. As shown in FIGS. 2 and 4, between the second seal cap 170 and the first seal cap 160 is installed an inner spring 175, so the side passage hoe 152 can be opened or closed as the first seal cap 160 ascends or descends by a difference in the operations which is caused by the elastic force of the inner spring 175 and the viscosity of the liquid contents.

As shown in FIGS. 2 and 4, at a side surface wall of the cylinder housing 130 is formed a first leakage discharge hole 135 whose position corresponds to the top of 'the Highest Position of the first seal cap 160' (shown as "H" in FIG. 2) and whose position corresponds to the bottom of 'the Bottommost position of the second seal cap 170' (shown as "B" in FIG. 3), and a second leakage discharge hole 136 whose position corresponds to the bottom of 'the Highest Position of the second seal cap 170' (shown as "H" in FIG. 2) is formed. If a leakage occurs through a space between the first seal cap 160 and the second seal cap 170, the second seal cap 170 descends, and leakage occurs through the second leakage discharge hole 136 and the first leakage discharge hole 135. Since leakage occurs over the second seal cap 170 only when the liquid contents all pass through the small gaps between the first seal cap 160, the second seal cap 170 and the side surface wall of the cylinder housing 130, there is barely a possibility of leakage. When leakage occurs even under the above mentioned situation, as shown in FIG. 3, the second seal cap 170 ascends, and the leaked content is discharged through the second leakage discharge hole 136. Therefore, the present invention makes it possible to prevent the gathering of leaked contents at the portions except for the passages through which liquid contents pass.

In the conventional construction, the spring is installed in the space full of liquid contents all the time. The present invention however has features in that the inner spring 175 is positioned in a space between the first seal cap 160 and the second seal cap 170. The space formed between the first seal cap 160 and the second seal cap 170 may be filled with a small amount of liquid contents only when leakage occurs and may serve to efficiently discharge the leaked liquid contents immediately, so the inner spring 175 does not come into contact with the liquid contents as compared to the conventional invention, whereby damages such as corrosion don't occur in the present invention.

Next, as shown in FIGS. 2 to 4, to the top of the stem 140 is engaged a spray button 190 equipped with a spray passage 191 communicating in a lateral direction, and to the discharge port of the spray passage 191 is engaged a spray nozzle member 192. In this case, the spray nozzle member 192 is made from a transparent or semitransparent material. It is preferred that the spray nozzle member 192 whose colors change based on the spray angle of the spray nozzle member 192 is inserted between the spray passage 191 and the spry nozzle member 192, so the spray angles can be easily checked with bare eyes based on the differences in colors.

Meanwhile, as shown in FIGS. 2 and 4, when finishing a protection of the operation portions and an exterior, there is further provided an outer cover 195 at the top of which is formed an opening through which the spray button 190 passes and which is engaged to the under cap 110.

The operations of the spray pump according to an embodiment of the present invention will be described.

In a standby state as shown in FIG. 2, the liquid contents which are sucked via the check valve 132 are stored at the bottom of the first seal cap 160. In this case, the first seal cap 160 remains descended with respect to the piston rod 150 by means of the inner spring 175 and is closing the side passage hole 152.

As shown in FIG. 3, when a user presses the spray button 190, the piston rod 150 descends. In this case, the first seal cap 160 ascends a little with respect to the piston rod 150 by means of the pressure from the liquid contents gathered at the bottom of the first seal cap 160, so the side passage hole 152 is opened. Therefore, the liquid contents pass through the side passage hole 152, the fluid passage hole 151 and the spray passage 191 and are sprayed through the spray nozzle member 192.

Next, when the user releases the pressed spray button 190, the piston rod 150 ascends by the main spring 145. At this time, the first seal cap 160 keeps the descended state with respect to the piston rod 150 with the aid of the inner spring 175, and the side passage hole 152 is closed. The pressure of the lower side of the first seal cap 160 of the cylinder housing 130 is lowered by means of the ascending operation with respect to the cylinder housing 130 of the first seal cap 160, and the liquid contents are sucked in via the heck valve 132, and the sucked contents gather at the lower side of the first seal cap 160 of the cylinder housing 130 for thereby finishing one cycle.

As the present invention may be embodied in several forms without departing from the spirit or essential characteristics thereof, it should also be understood that the above-described examples are not limited by any of the details of the foregoing description, unless otherwise specified, but rather should be construed broadly within its spirit and scope as defined in the appended claims, and therefore all changes and modifications that fall within the meets and bounds of the claims, or equivalences of such meets and bounds are therefore intended to be embraced by the appended claims.

The invention claimed is:

1. A spray pump which sprays liquid contents, comprising:

an under cap (110) which has a through hole (111) at its center;

an over cap (120) which is engaged to the through hole (111) of the under cap (110) and has a stem installation hole (121) at its inner side;

a cylinder housing (130) which is engaged to the bottom of the over cap (120) and has a suction through hole at its lower side and a check valve (132) installed at an inner, lower side of the top of the suction through hole for thereby allowing fluids to flow only in a suction direction;

a stem (140) which passes through the stem installation hole (121) of the over cap (120), the center of the stem being passed through from its top to bottom;

a main spring (145) which is installed between the over cap (120) and an outer circumferential surface of the stem (140);

a piston rod (150) which is inserted into the bottom of the stem (140) and has, on its central axis, a fluid passage hole (151) whose top is open and whose bottom is closed, at least two side passage holes (152) being formed at the lower side surface of the fluid passage hole (151);

a first seal cap (160) which is installed movable in upward and downward directions at the bottom of the piston rod (150) and closes the side passage hole (152) at a descending point and opens the side passage hole (152) at an ascending point, an outer circumferential surface of the first seal cap (160) coming into close contact with an inner surface of the cylinder housing (130);

a second seal cap (170) which is engaged to the piston rod (150) at the top of the first seal cap (160), thereby ascending and descending with the piston rod (150), wherein an outer circumferential surface of the second seal cap (170) comes into close contact with an inner surface of the cylinder housing (130);

an inner spring (175) which is installed between the second seal cap (170) and the first seal cap (160);

a first leakage discharge hole (135) which is formed at a side surface wall of the cylinder housing (130) and is positioned at the top of the Highest Position of the first seal cap (160) and the bottom of the Bottommost Position of the second seal cap (170);

a second leakage discharge hole (136) which is formed at a side surface wall of the cylinder housing (130) and is positioned at the bottom of the Highest Position of the second seal cap (170), and which enables the leaked contents between the first seal cap (160) and the second seal cap (170) to be discharged through;

a spray button (190) which is engaged to the top of the stem (140) and has a spray passage (191) communicating in a lateral direction; and a spray nozzle member (192) which is engaged to a discharge port of the spray passage.

2. The pump of claim 1, wherein the stem (140) has a spring engaging shoulder (141) formed along an outer circumferential surface of the top, and main spring (145) is installed between the upper surface of the over cap (120) and the spring engaging shoulder (141), and an outer cover (195) has an opening (196) formed at its top through which opening passes the spray button (190) and is engaged to the under cap (110).

3. The pump of claim 1, wherein the spray nozzle member (192) is made from a transparent material or a semitransparent material, and a spray nozzle connection member (193), which is manufactured in different colors so as to be determined according to spray angles of the spray nozzle member (192), can be replaced selectively and inserted additionally between the spray passage (191) and the spray nozzle member (192).

4. The pump of claim 2, wherein the spray nozzle member (192) is made from a transparent material or a semitransparent material, and a spray nozzle connection member (193), which is manufactured in different colors so as to be determined according to spray angles of the spray nozzle member (192), can be replaced selectively and inserted additionally between the spray passage (191) and the spray nozzle member (192).

* * * * *